United States Patent [19]
Masaki et al.

[11] Patent Number: 5,990,657
[45] Date of Patent: Nov. 23, 1999

[54] INVERTER SYSTEM AND CONTROL SYSTEM FOR ELECTRIC VEHICLE

[75] Inventors: Ryoso Masaki; Yuusuke Takamoto, both of Hitachi; Satoru Kaneko, Urizura-machi; Fumio Tajima, Juo-machi; Hiroshi Katada, Hitachinaka, all of Japan

[73] Assignee: Hitachi, Ltd., Tokyo, Japan

[21] Appl. No.: 08/808,809

[22] Filed: Feb. 28, 1997

[30] Foreign Application Priority Data

Feb. 29, 1996 [JP] Japan .................................. 8-042432

[51] Int. Cl.⁶ ........................................................ H02M 7/48
[52] U.S. Cl. .......................... 318/811; 318/812; 318/139; 363/160
[58] Field of Search ................................ 363/98, 132, 95, 363/41, 58, 87, 127, 160, 54, 129; 318/811, 801, 803, 802, 807, 805, 139, 245, 254, 812, 823

[56] References Cited

U.S. PATENT DOCUMENTS

| | | | |
|---|---|---|---|
| 4,234,901 | 11/1980 | Strickland, Jr. | 361/64 |
| 4,309,752 | 1/1982 | Stacey | 363/10 |
| 4,321,663 | 3/1982 | Krtek . | |
| 4,390,938 | 6/1983 | Stacey | 363/54 |
| 5,072,354 | 12/1991 | Katto et al. | 363/41 |
| 5,329,439 | 7/1994 | Borojevic et al. | 363/87 |
| 5,450,306 | 9/1995 | Garces et al. | 363/41 |
| 5,650,708 | 7/1997 | Sawada et al. | 318/801 |
| 5,701,070 | 12/1997 | Schultz | 322/37 |
| 5,757,636 | 5/1998 | Fletcher | 363/98 |

FOREIGN PATENT DOCUMENTS 7-46855  2/1995  Japan .

*Primary Examiner*—Paul Ip
*Attorney, Agent, or Firm*—Antonelli, Terry Stout & Kraus, LLP

[57] ABSTRACT

An inverter system providing both an improvement in the voltage utilization factor and a reduction in the switching loss uses a two-phase switching method. In the inverter system, an α-axis voltage command value; $v_{\alpha r}$ and a β-axis voltage command value $v_{\beta r}$ are input to a stop phase selection means. Six sections are judged based on the values $v_{\alpha r}$ and $v_{\beta r}$ to select phases for which it is allowable to stop pulse width modulation control in a two-phase switching method. Then, a phase having the largest absolute value of current is selected among the phases for which it is allowable to stop pulse width modulation control using a U-phase current $i_u$ and a V-phase current $i_v$. This information is a control mode S. Based on these, two-phase switching calculations are performed by a dead-time compensation calculation means and a pulse width modulation generating means. By doing so, the switching loss can be reduced.

11 Claims, 10 Drawing Sheets

INVERTER SYSTEM AND CONTROL SYSTEM FOR ELECTRIC VEHICLE

BACKGROUND OF THE INVENTION

The present invention relates to an inverter system capable of reducing switching loss and a control system for an electric vehicle using the inverter system. More particularly, the invention relates to an inverter system, suitable for a control system for a vehicle, which is able to improve the utilization factor of the battery voltage and provide high efficiency driving.

As a common method of driving a three-phase alternating current motor using sinusoidal wave currents provided by an inverter system, there is a known method of switching inverters using a three-phase pulse width modulation signal. On the other hand, a method of supplying sinusoidal wave currents while reducing the switching loss is disclosed in U.S. Pat. No. 4,321,663. This method has been referred to as a two-phase switching method in which the switching of one of the three-phases is stopped (an upper arm or a lower arm of the one phase of an inverter is set in the ON-state) and is controlled so that its line-to-line voltage becomes a sinusoidal wave voltage using the pulse width modulation signals of the other phases.

Employing this method has two advantages. The first advantage is that the switching loss can be reduced to ⅔ of the switching loss in the three-phase switching method since the frequency of switching is reduced. The second advantage is that the range of the output voltage of the inverter system allowing the sinusoidal wave output current to flow can be expanded by 15% when the voltage of the inverter power source is constant. Hereinafter, this effect is referred to as an improvement in the voltage utilization factor.

A method which can further reduce the switching loss to a greater extent than the former method is disclosed in Japanese Patent Application Laid-Open No.7-46855. That is, in a two-phase switching method, a phase in which a large current is flowing can be selected as a target phase for which the switching is stopped in accordance with a phase difference in the output voltage and the output current of the inverter system, since the switching loss increases with an increasing switching current. In order to generate a predetermined sinusoidal wave output voltage in the two-phase switching method, the ranges in which the switching can be stopped include a range from 30 degrees to 150 degrees and a range from 210 degrees to 330 degrees in the phase of the sinusoidal wave voltage. In general, as described in the former reference, the switching is stopped in a range from 60 degrees to 120 degrees and a range from 240 degrees to 300 degrees in the phase of the sinusoidal wave voltage. Therefore, the phase of the two-phase switching within these ranges is referred to as a reference phase.

With respect to the reference phase, the phases of the two-phase switching are shifted within the ranges from 30 degrees to 150 degrees and from 210 degrees to 330 degrees so that switching is stopped for a phase having the largest output current in absolute value. Therefore, in the method of the latter reference, the switching loss can be reduced since the phase having the lowest currents are used for the switching.

The method of the latter reference has a disadvantage in that, since it is necessary to detect or calculate a phase difference between the output voltage and the output current from the inverter in order to improve the voltage utilization factor and decrease the switching loss, the construction of a control method for generating the pulse width modulation signals becomes complex.

Further, in the method of the latter reference, it has been found that, in a case where the phase difference between the voltage and the current exceeds 60 degrees, a phase having a large current is switched when only a given section is considered.

SUMMARY OF THE INVENTION

An object of the present invention is to provide an inverter system which can improve the voltage utilization factor and decrease the switching loss with a simple pulse width modulation control system.

Another object of the present invention is to provide an electric vehicle control system which combines the two-phase switching pulse width modulation control method and an electric vehicle motor control method.

The object of the present invention can be attained by providing an inverter system comprising inverters for supplying electric power to a multi-phase load according to pulse width modulation signals, and a controller for controlling the inverters while a pulse width modulation signal for any one phase among the pulse width modulation signals is being stopped, wherein the controller controls the inverters by selecting a plurality of phases for which the pulse width modulation signals can be stopped and by stopping a pulse width modulation signal for a phase having the largest phase current among the selected plurality of phases.

Another object of the present invention can be attained by providing an electric vehicle control system comprising a multi-phase alternating current motor for driving the vehicle, an inverter system for controlling said alternating current motor, and a controller for generating pulse width modulation signals to be input to the inverter system based on a current command value for the alternating current motor, wherein the alternating current motor has a high power factor and a pulse width modulation signal to a selected phase is, stopped, that is the upper arm or the lower arm of the inverter is set to the ON-state, the phase for which the supply of a PWM signal is stopped being selected appropriately corresponding to the kind of alternating current motor, such that its switching loss is minimized.

DETAILED DESCRIPTION OF THE PREFERRED EMBODIMENTS

Figure 1:
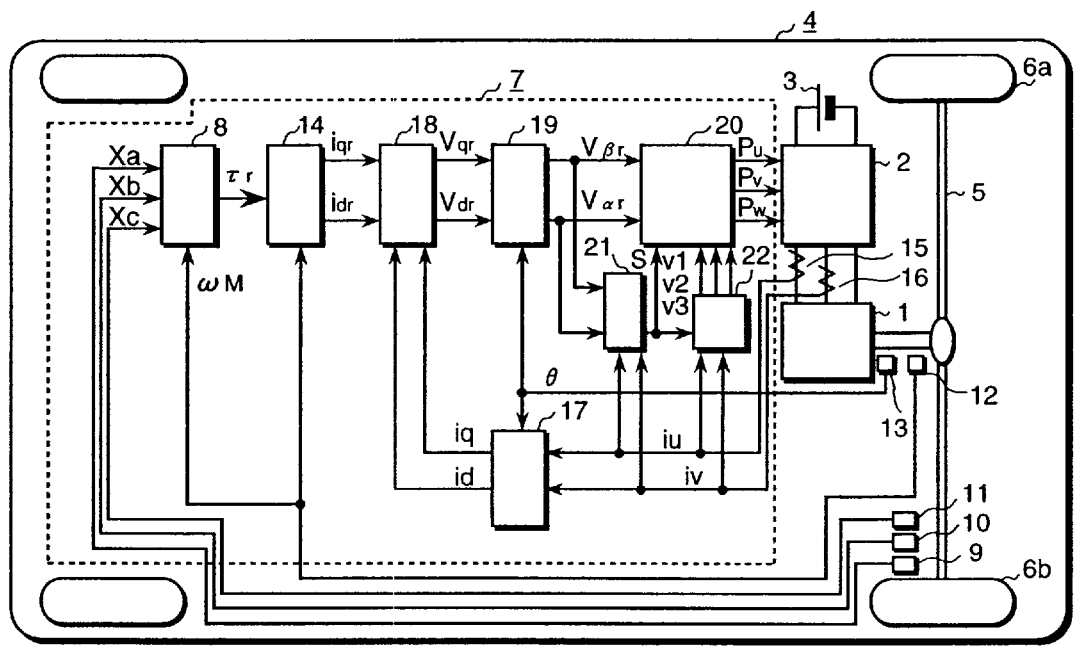
FIG. 1 is a block diagram showing an embodiment of an electric vehicle drive circuit for driving an electric vehicle using a synchronous motor in accordance with the present invention.

An embodiment of the present invention will be described in detail below referring to FIG. 1. FIG. 1 shows an electric vehicle in which a synchronous motor 1 is controlled by a three-phase inverter 2 to drive a vehicle body 4. The inverter 2 drives the synchronous motor 1 by converting energy of a direct current power source (vehicle-mounted battery) 3 into a three-phase alternating current voltage using a controller 7. The synchronous motor can drive the vehicle body 4 by transmitting motor torque to tires 6a, 6b through a shaft 5. A driver operates an accelerator pedal 9, a brake pedal 10 and a switch 11. A torque command generator 8 receives a depression amount $x_a$ of the accelerator pedal 9, a depression amount $x_b$ of the brake pedal 10, a switch signal $x_c$ of the switch 11 instructing forward running, backward running and stopping, and a motor speed signal $\omega_M$ of the synchronous motor 1 output from a speed sensor 12, and calculates a torque command value $\tau_r$ for the synchronous motor 1.

In the controller 7, the torque command value $\tau_r$ is input to a current command generating means 14 to calculate a d-axis current command value $i_{dr}$ corresponding to a magnetic pole of the synchronous motor in a rotating coordinate system and a q-axis current command value $i_{qr}$ intersecting at right angles with the d-axis current command value through a well-known vector control method. The d-axis current command value $i_{dr}$ is used for increasing and decreasing magnetic flux of magnets placed in the magnetic poles of the synchronous motor 1, and can be optimized using the torque command value $\tau_r$ and the motor speed signal $\omega_M$. Thereby, a total magnetic flux $\phi$ of the synchronous motor 1 is determined. Since a product of the total magnetic flux $\phi$ and the q-axis current command value $i_{qr}$ is a torque command value $\tau_r$, the q-axis current command value $i_{qr}$ is determined by the torque command value $\tau_r$ and the d-axis current command value $i_{dr}$.

The controller 7 receives a magnetic pole position θ detected by a magnetic pole position detector 13, and a U-phase current $i_u$ and a V-phase current $i_v$ detected by current sensors 15 and 16, respectively, as information concerning the operating state of the synchronous motor 1. A coordinate transforming means 17 transforms the U-phase current $i_u$ and the V-phase current $i_v$ into currents in the rotating coordinate system of the poles, that is, into a d-axis current $i_d$ and a q-axis current $i_q$ using the magnetic pole position θ. A current control means 18 receives the d-axis current command value $i_{dr}$, the q-axis current command value $i_{qr}$, the d-axis current $i_d$ and the q-axis current $i_q$, and calculates a d-axis voltage command value $v_{dr}$ and a q-axis voltage command value $v_{qr}$ through current control calculation so that each of the current command values agrees with actual current values. These values are values in the rotating coordinate system, and are transformed into an α-axis voltage command value $v_{\alpha r}$ and a β-axis voltage command value $v_{\beta r}$ in a stationary coordinate system using the magnetic pole position θ.

Figure 2:
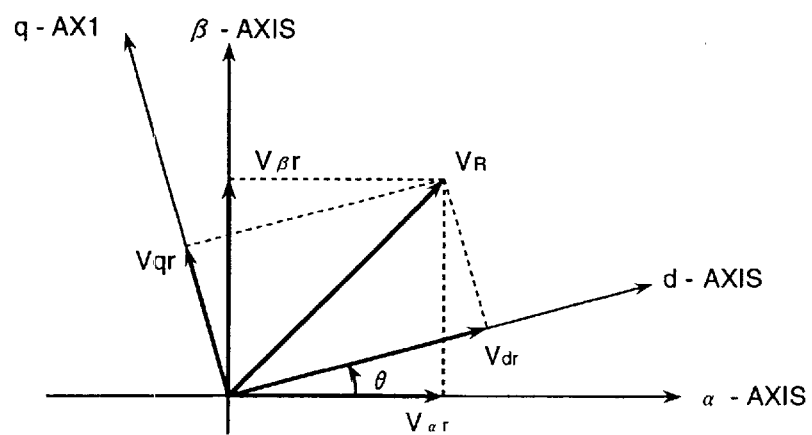
FIG. 2 is a vector diagram showing a vector voltage command value for the synchronous motor in an embodiment of the present invention depicted in a stationary coordinate system of α-β axes and a rotating coordinate system of d-q axes.

FIG. 2 is a vector diagram showing the relationship between $v_{\alpha r}$, $v_{\beta r}$, $v_{dr}$, $v_{qr}$ and the magnetic pole position θ. The vector voltage command value $V_R$ in the figure is the sum of $v_{\alpha r}$ and $v_{\beta r}$, and is also the sum of $v_{dr}$ and $v_{qr}$. Then, pulse width modulation signals $P_U$, $P_V$, $P_W$ are output by using a stopped phase selection means 21, a dead-time compensation means 22 and a pulse width modulation generating means 20 through calculation for two-phase switching characterizing the present invention using $v_{\alpha r}$ and $v_{\beta r}$, the U-phase current $i_u$ and the V-phase current $i_v$. Using the pulse width modulation signals, the inverter 2 is controlled to drive the synchronous motor 1.

Figure 3:
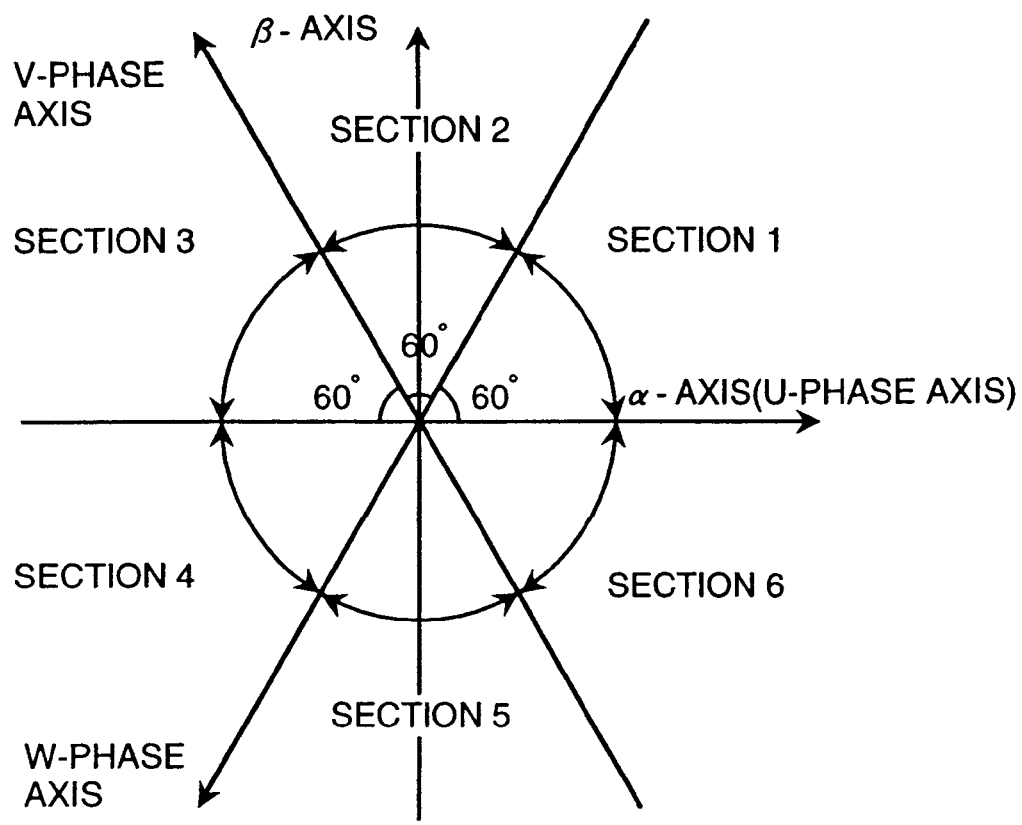
FIG. 3 is a vector diagram for dividing a voltage command value into six sections in order to simplify the two-phase switching calculation in an embodiment of the present invention.

The stopped phase selection means 21, the dead-time compensation means 22 and the pulse width modulation generating means 20 will be described in detail below. In this method, it is important to divide the stationary coordinate system into six sections depending on the phase of the vector voltage command value $V_R$, and the dividing method is shown in FIG. 3. The stationary coordinate system is divided into section 1 to section 6 every 60 degrees from 0 (zero) degree of the α-axis (the axis agrees with the U-phase axis). In order to generate three-phase sinusoidal currents, all of the inter-line voltages must be sinusoidal waves. In order to perform the two-phase switching under this condition, there is no way except for stopping a phase having the maximum voltage or the minimum voltage among the three phases.

In other words, a phase in which the phase voltage has a middle value cannot be allowed to stop the pulse width modulation signal. Two phases in which the pulse width modulation signal can be allowed to be stopped are always determined depending on which section the vector voltage command value $V_R$ is in. For example, when the vector voltage command value $V_R$ is in the section 1, the maximum value of the phase voltage is in the U-phase and the minimum value of the phase voltage is in the W-phase. Therefore, it is inevitable that by setting either the U-phase voltage to the maximum value $V_{MAX}$ of the inverter output voltage or the W-phase voltage to the minimum value $-V_{MAX}$ of the inverter output voltage, the pulse width modulation signal is stopped to perform two-phase switching.

That is, when the vector voltage command value $V_R$ is in the section 1, the switching loss can always be reduced by stopping the pulse width modulation signal to a phase having a larger current in absolute value between the U-phase and the W-phase. It is possible to reduce the switching loss in the same way whichever section the vector voltage command value $V_R$ is in.

Figure 4:
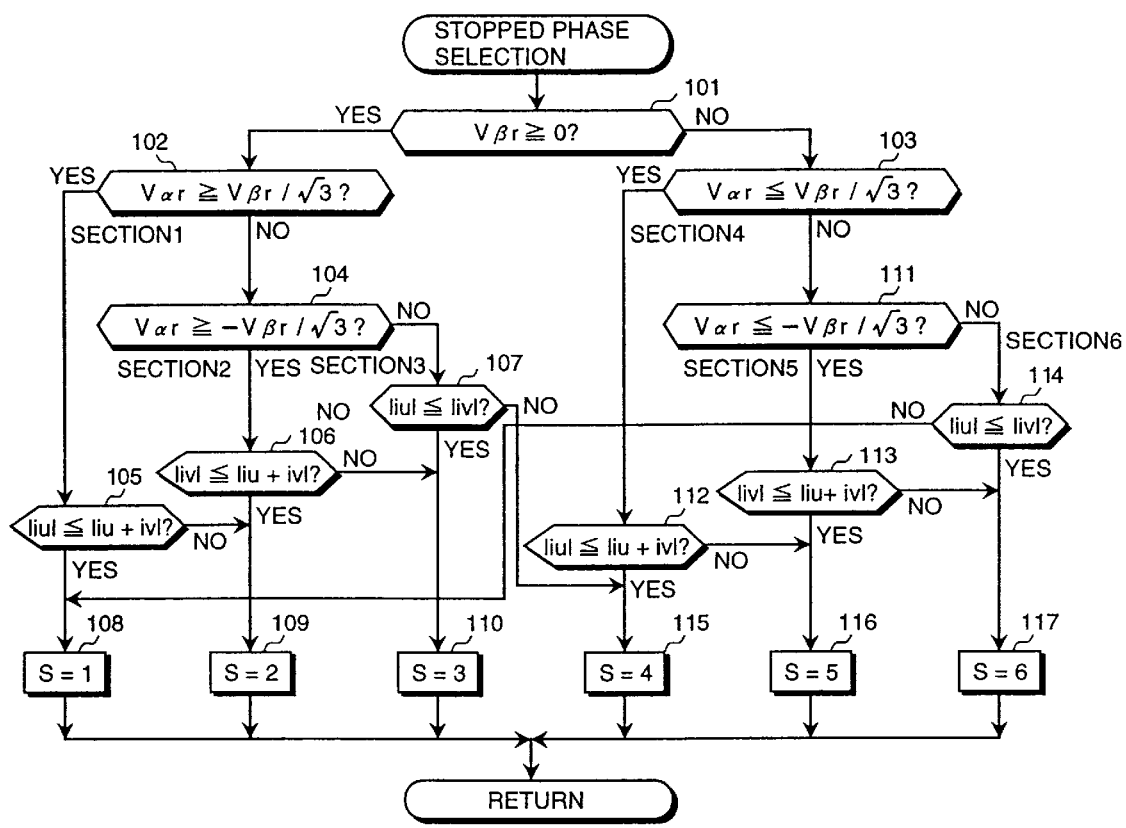
FIG. 4 is a flow chart showing the process for determining a phase and its switching element to stop switching thereof in an embodiment of a switching stop phase selection means of the present invention.

FIG. 4 shows a calculation method based on this idea as performed in the stopped phase selection means 21. Judgement of the section in FIG. 3 is performed in step 101 to step 104 and step 111 in the flow chart. By judging the sign of $v_{\beta r}$ in step 101, it is possible to judge whether the vector voltage command value is in the section 1 to the section 3 or in the section 4 to the section 6. When the sign of $v_{\beta r}$ is positive, $v_{\alpha r}$ and $v_{\beta r}/\sqrt{3}$ are compared in step 102. If $v_{\alpha r}$ is larger, it is judged that the vector voltage command value is in the section 1 and the processing advances to step 105. If $v_{\alpha r}$ is smaller, by comparing $v_{\alpha r}$ and $-v_{\beta r}/\sqrt{3}$ in step 104 it is judged whether the vector voltage command value is in the section 2 or the section 3. If $v_{\alpha r}$ is larger, it is judged that the vector voltage command value is in the section 2 and the processing advances to step 106. If $v_{\alpha r}$ is smaller, it is judged that the vector voltage command value is in the section 3 and the processing jumps to step 107. When the sign of $v_{\beta r}$ is negative, similar processing is performed in step 103 and step 111, wherein it is judged that the vector voltage command value is in the section 4, the section 5 or the section 6, and the processing jumps to step 112, step 113 or step 114, respectively. In step 105 where the processing is performed when it is judged that the vector voltage command value is in the section 1, the absolute values of the U-phase current $i_u$ and the W-phase current $i_w$ are compared. Since in the embodiment the W-phase current $i_w$ is not input, it is obtained from the relation $i_w=-(i_u+i_v)$.

If the absolute value of $i_u$ is larger than the absolute value of $(i_u+i_v)$, the control mode S=1 is selected in step 108 in order to set the U-phase voltage to the maximum value $V_{max}$. If not, the control mode S=2 is selected in step 109 in order to set the W-phase voltage to the minimum value $-V_{max}$. Similar calculations are performed in steps 106, 107, 112, 113 and 114. The control modes from S=3 to S=6 are selected to set the V-phase voltage to the maximum value $V_{MAX}$, the U-phase voltage to the minimum value $-V_{MAX}$, the W-phase voltage to the maximum value $V_{MAX}$, the V-phase voltage to the minimum value $-V_{MAX}$, respectively, which are used for calculations in the dead-time compensation means 22 and the pulse width modulation generating means 20. As described above, by calculating a section of the voltage command and a control mode S, it is possible to stop switching in a phase which can make the switching loss minimum when the vector voltage command value is in a particular section.

In a judgement of an equal sign in calculation, it is possible to employ an averaging method instead of fixing to one section.

Figure 5:
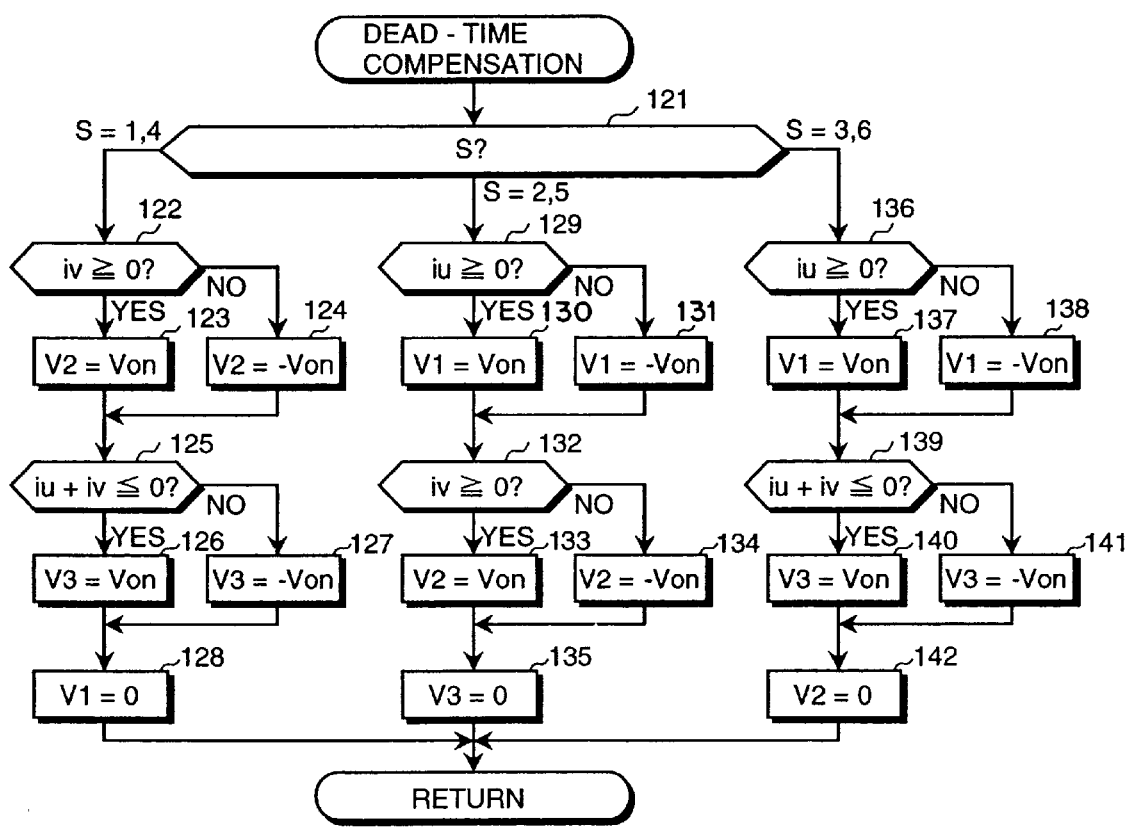
FIG. 5 is a flow chart showing the process for calculating a dead-time compensation for the two-phase switching using an embodiment of a dead-time compensation means in accordance with the present invention.

The dead-time compensation means 22 will be described in detail below, referring to the flow chart of FIG. 5. The dead-time compensation means 22 receives a control mode S, a U-phase current $i_u$ and a V-phase current $i_v$. In step 121, the control mode is judged. If S=1 or 4, the processing jumps to step 122. If S=2 or 5, the processing jumps to step 129. If S=3 or 6, the processing jumps to step 136. In a case of S=1 or 4, control of the U-phase is stopped and the other phases are used to perform the pulse width modulation control. Therefore, the dead-time compensations for the V-phase and the W-phase are performed through calculations from step 122 to step 128. In step 122, the sign of the V-phase current $i_v$ is judged. If the V-phase current is positive, a V-phase compensation voltage $V_2$ is set to a dead-time compensation voltage $V_{on}$ in step 123. If the V-phase current is negative, $V_2$ is set to $-V_{on}$ in step 124. By doing so, it is possible to compensate the phase voltage shifting from the voltage command value depending on the direction of current due to the effect of the dead-time period of the pulse width modulation signal.

Similarly, the dead-time compensation calculation for the W-phase is performed in step 125 to step 127, and a W-phase compensation voltage $V_3$ is calculated. The reason why the U-phase compensation voltage $V_1$ is set to 0 (zero) in step 128 is that there is no voltage drop due to dead-time since the U-phase is not performing pulse width modulation control. Thereby, the inter-line voltage can be formed in an appropriate sinusoidal wave not having any distortion without being affected by the dead-time even in a case of the two-phase switching operation. The calculations from step 129 to step 135 are dead-time compensation calculations when the pulse width modulation control of the W-phase is stopped, and the calculations from step 136 to step 142 are dead-time compensation calculations when the pulse width modulation control of the V-phase is stopped. However, a more detailed explanation will be omitted here since the calculation process is the same as in the case of the U-phase.

Figure 6:
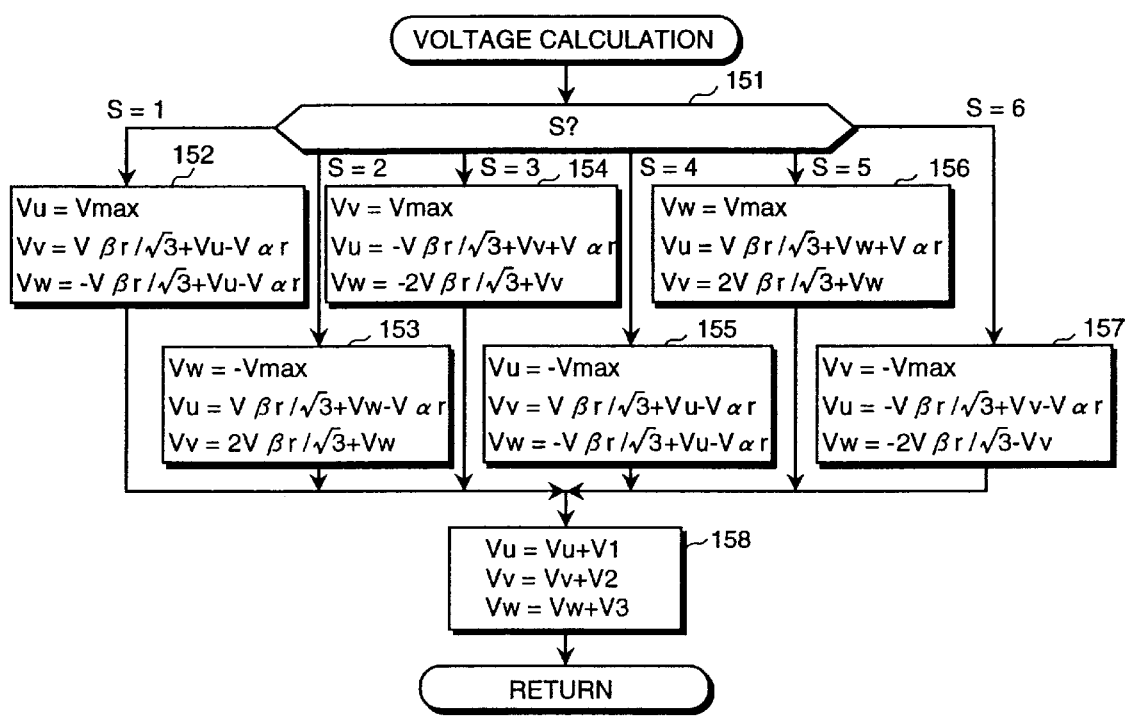
FIG. 6 is a flow chart showing the process for calculating a voltage command value for each phase to perform two-phase switching using an embodiment of a pulse width modulation signal generating means in accordance with the present invention.
Figure 7A:
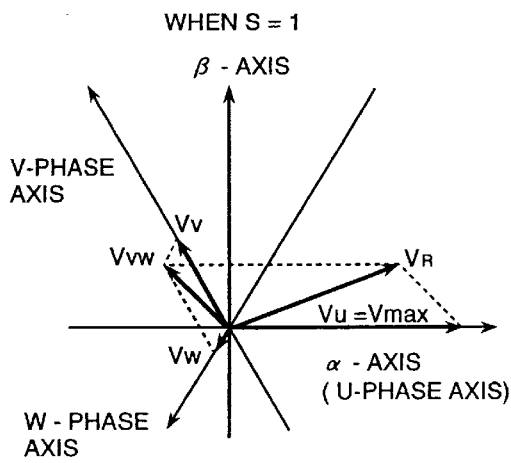
FIGS. 7A and 7B are vector diagrams for explaining the meaning of the calculation for the voltage command value for each phase in FIG. 6.
Figure 7B:
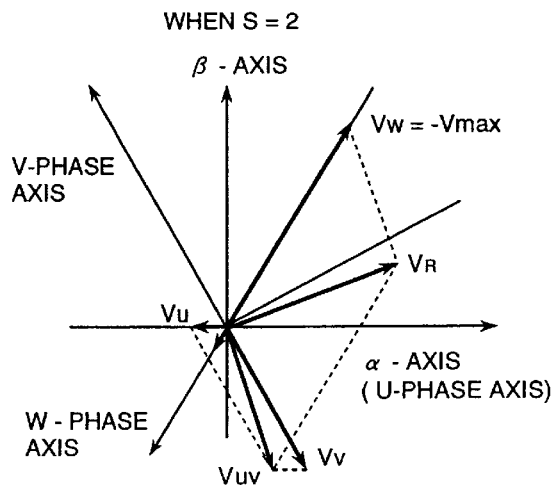

In the pulse width modulation generating means 20, the process shown in FIG. 6 is performed using the control mode S, $v_{\alpha r}$, $v_{\beta r}$, $V_1$, $V_2$ and $V_3$. The control mode S is judged in step 151 to distribute the processing path to step 152 to step 157 depending on the value of S=1 to 6. When S=1, the calculation in step 152 is performed since the U-phase voltage command is set to the maximum value $V_{MAX}$, that is, a switching element in the upper arm of the U-phase is set in the ON-state. When this situation is expressed by a vector diagram, FIG. 7A is obtained. When $V_u=V_{MAX}$, $V_V$ and $V_W$ are solely determined in order to generate the vector voltage command value $V_R$. When the vector voltage command value $V_R$ is the same, but the control mode S=2, as shown in FIG. 7B, the calculation method branches to step 153 of FIG. 6. In this case, a switching element in the lower arm of the W-phase is in the ON-state, and $V_V$ and $V_W$ suitable for this state are calculated as shown in FIG. 7B.

The processing in step 154 to step 157 of FIG. 6 is the same as the above. In step 158, the pulse width modulation signal for each phase $P_U$, $P_V$ or $P_W$ is generated by adding thereto the compensation voltage for each phase calculated in the dead-time compensation means 22. By performing the above processing, it is always possible to stop switching of a phase having the largest phase current among the selective phases under the condition of two-phase switching and the inter-line voltage with a sinusoidal wave. Therefore, it is always possible to minimize the switching loss. Further, since dead-time compensation suitable for the two-phase switching can be performed, it is possible to maintain the current form in a nearly sinusoidal wave.

Figure 8:
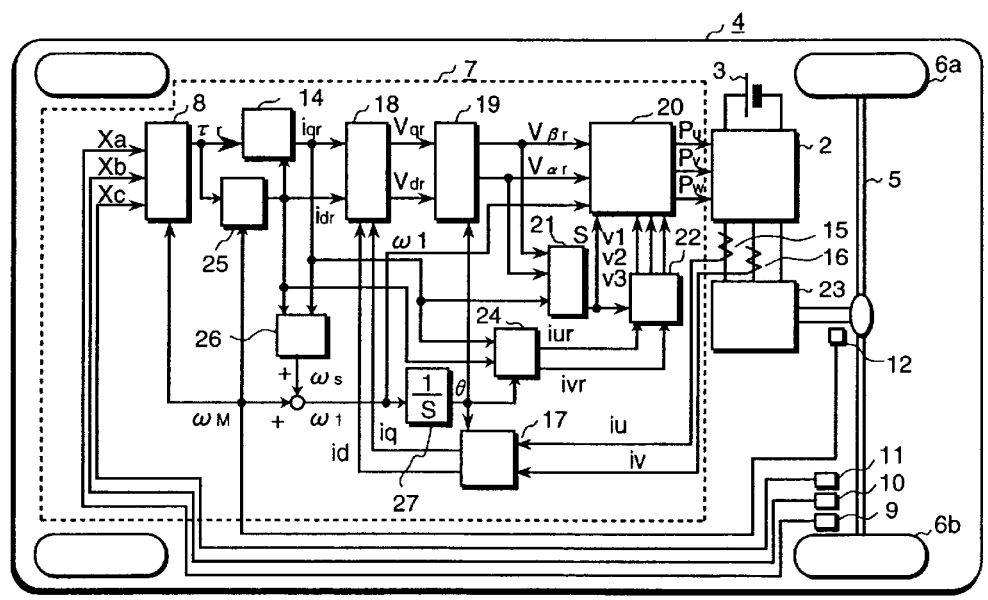
FIG. 8 is a block diagram showing a drive circuit of the embodiment of the present invention which is applied to an electric vehicle having an induction motor.

FIG. 8 shows another embodiment where the present invention is applied to an electric vehicle having an induction motor 23. Different points of FIG. 8 from FIG. 1 will be described. An optimum field control calculation means 25 calculates a d-axis current command value $i_{dr}$ for generating a magnetic flux using a torque command value $\tau^r$ and a motor speed value $\omega_M$. In the case of an induction motor, although the magnetic flux must always be generated using the d-axis current command value $i_{dr}$, it is known that the loss can be reduced by weakening the magnetic flux when the torque is small. The switching loss can be further reduced by combining the weak field control with the two-phase switching. In other words, since the phase difference between voltage and current of the induction motor can be decreased by performing weak field control, it is possible to increase the time period during which a large current flows in the phase which is allowed to stop the pulse width modulation control in the two-phase switching. Therefore, the switching loss can be further reduced.

A slip angular frequency calculation means 26 is provided for obtaining a slip angular frequency $\omega_s$ of the induction motor 23 and a magnetic flux phase angle calculation means 27 is provided for obtaining a magnetic flux phase angle $\theta$ from a first order angular frequency $\omega_0$ of the sum of the motor speed $\omega_M$ and the slip angular frequency $\omega_s$. These means are generally well-known technologies. A coordinate system transforming means 24 transforms a d-axis current command value $i_{dr}$ and a q-axis current command value $i_{qr}$ into a U-phase current command value $i_{ur}$ and a V-phase current command value $i_{vr}$ using the magnetic flux phase angle $\theta$. In the dead-time compensation means 22, the U-phase current command value $i_{ur}$ and the V-phase current command value $i_{vr}$ are used to perform the dead-time compensation calculation instead of using the U-phase current $i_u$ and the V-phase current $i_v$. By doing so, more stable and more efficient control can be performed, since it is possible to protect the control system from disturbance due to current detecting noise.

Further, the stopped phase selection means 21 performs a processing method suitable for the induction motor.

Figure 9:
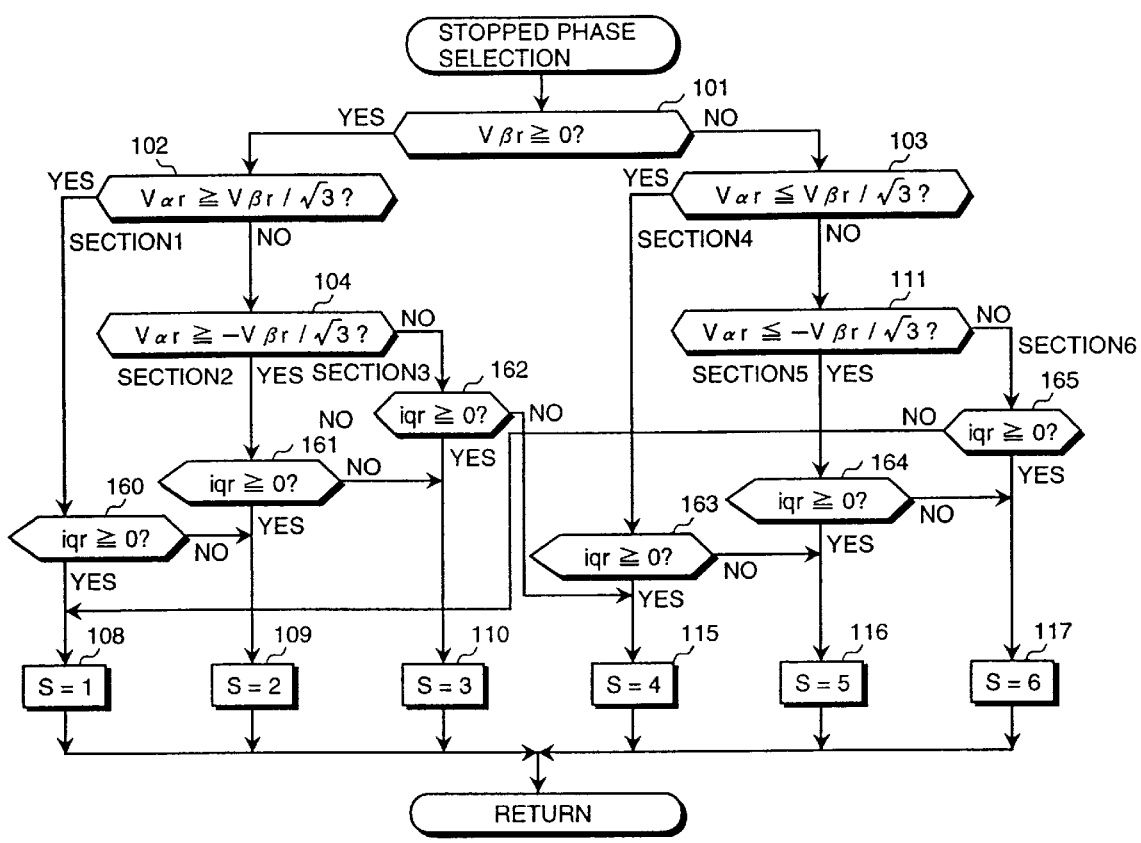
FIG. 9 is a flow chart showing the process for determining a phase and its switching element to stop switching using a q-axis current command value in the stop phase selection means of FIG. 8.

The method described above is shown in FIG. 9. The processing from steps 101 to 104 and step 111 are the same as that in FIG. 4. All the processing in steps 160 to 165 are the same. For example, when the q-axis current command value $i_{qr}$ is positive in the section 1, the control mode S is set to 1, and when negative, the control mode S is set to 2. The positive q-axis current command value $i_{qr}$ means that the induction motor 23 is in power driving. At that time, in most types of induction motors, it is seldom that the phase difference between voltage and current becomes below 30 degrees even when weak field control is performed.

Therefore, since the phase difference is above 30 degrees in the section 1 when the induction motor is in power driving, the absolute value of the U-phase current is larger than the absolute value of the W-phase current. When $i_{qr}$ is negative, the induction motor is in regeneration, and the phase difference exceeds 90 degrees and becomes above 120 degrees. Therefore, the absolute value of the W-phase current is possibly larger than the absolute value of the U-phase current. From the above, it is possible to reduce the switching loss through simpler calculation.

Figure 10:
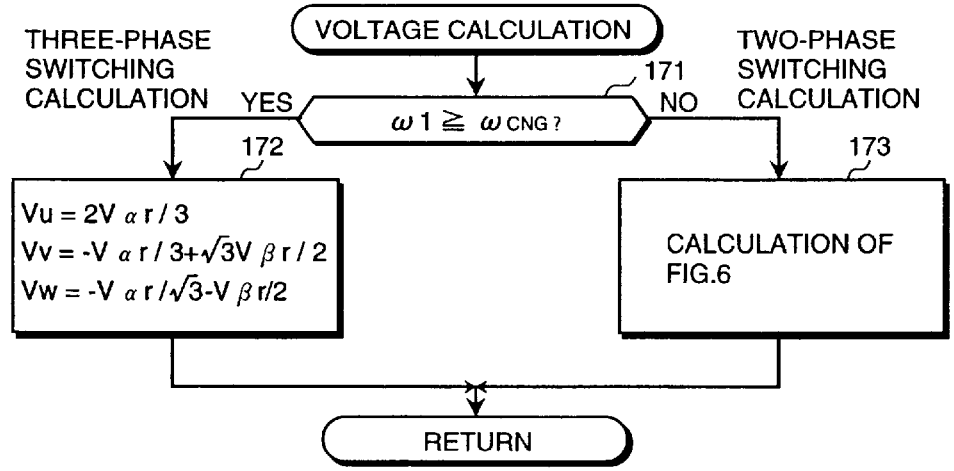
FIG. 10 is a flow chart showing the process for switching between three-phase switching and two-phase switching depending on first-order angular frequency in the embodiment in accordance with the present invention.

Further, the pulse width modulation generating means 20 performs the calculation shown in FIG. 10. That is, when it is judged that the first order angular frequency $\omega_1$ is larger than a two-phase/three-phase switching angular frequency $\omega_{CNG}$ in step 171, the processing in step 172 is performed in order to switch the control to a general three-phase switching control. When the first order angular frequency $\omega_1$ is smaller than a two-phase/three-phase switching angular frequency $\omega_{CNG}$, the processing of FIG. 6 is performed in step 173. By performing such processing, in a high frequency inverter driving a high speed motor, such as an electric vehicle motor, it is possible to prevent generation of current pulsation in high frequency current control. Therefore, by employing the present embodiment, it is possible to reduce the switching loss and to maintain stability of current control.

Figure 11:
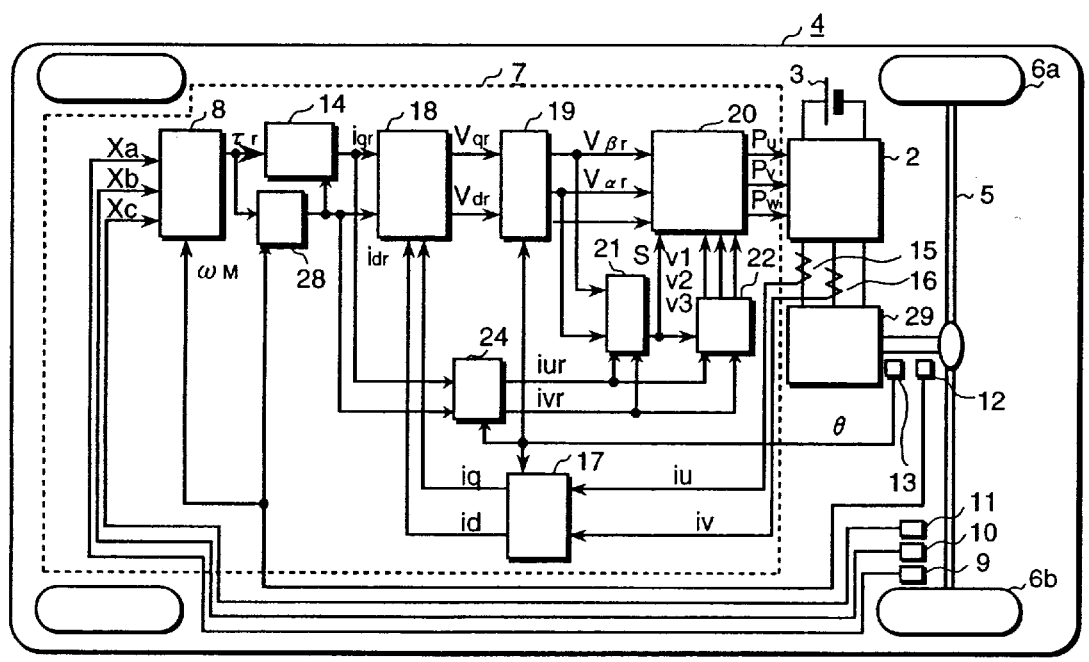
FIG. 11 is a block diagram showing an embodiment of a drive circuit in accordance with the present invention in which a magnet synchronous motor is used for field control.

FIG. 11 shows an embodiment of two-phase switching which performs field control using a magnet synchronous motor having magnets. Employing the magnet synchronous motor 29 in FIG. 11 is the main difference from the embodiment of FIG. 8 in which the induction motor 23 is employed.

A field control means 28 characterizing the embodiment of FIG. 11 will be described. The point that the field control means 28 receives a torque command value $\sigma_r$ and a motor speed $\omega_M$ is the same as the optimum field control calculation means 25 of FIG. 6. The magnet synchronous motor 29 can be driven when the d-axis current command value $i_{dr}$ is 0 (zero) since magnetic flux exists, and can be driven up to a high rotating speed region by changing the d-axis current command value $i_{dr}$ and can improve its efficiency by performing weak field control.

In addition, in an electric vehicle, it is also possible to generate a high torque by increasing the magnetic flux depending on necessity. When the magnet synchronous motor is operated in such a manner, the power factor of the magnet synchronous motor 29 is changed. However, the field control means 28 calculates the d-axis current command value $i_{dr}$ so that the power factor comes within 0.87 in both delay and advance. By this calculation, the phase difference between the current and voltage of the magnet synchronous motor 29 can always be kept within ±30 degrees. When the processing of FIG. 6 is performed in the stopped phase selection means 21 under such a control condition, a phase having the largest absolute current among the three phase currents can always be selected as the switching stopped phase.

Accordingly, by employing the embodiment of FIG. 11, the system efficiency can be improved, since it is always possible to select a two-phase switching method which will minimize the switching loss.

Figure 12:
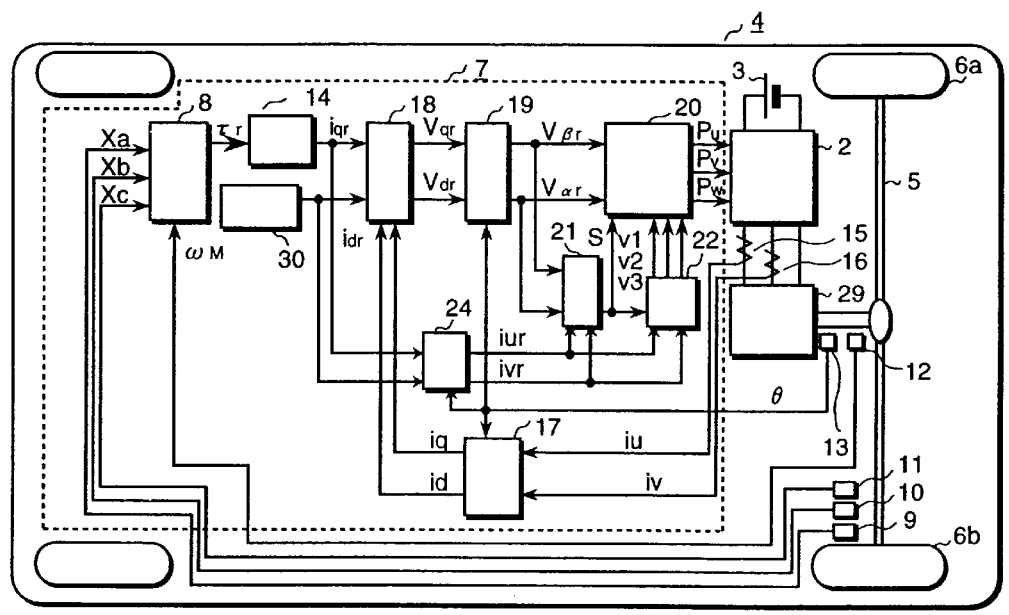
FIG. 12 is a block diagram showing a drive circuit in accordance with the present invention where two-phase switching is performed with the power factor being always maintained to nearly one.

FIG. 12 shows a further embodiment of an electric vehicle in which field control is not performed. A d-axis current command value means 30 outputs a constant value of a d-axis current command value $i_{dr}$=0. In this case, since the power factor of the magnet synchronous motor 29 can be maintained at nearly 1 (one), the stopped phase selection means 21 does not receive any information on current, which is different from the other embodiments. The processing method is simple as shown in FIG. 13.

Figure 13:
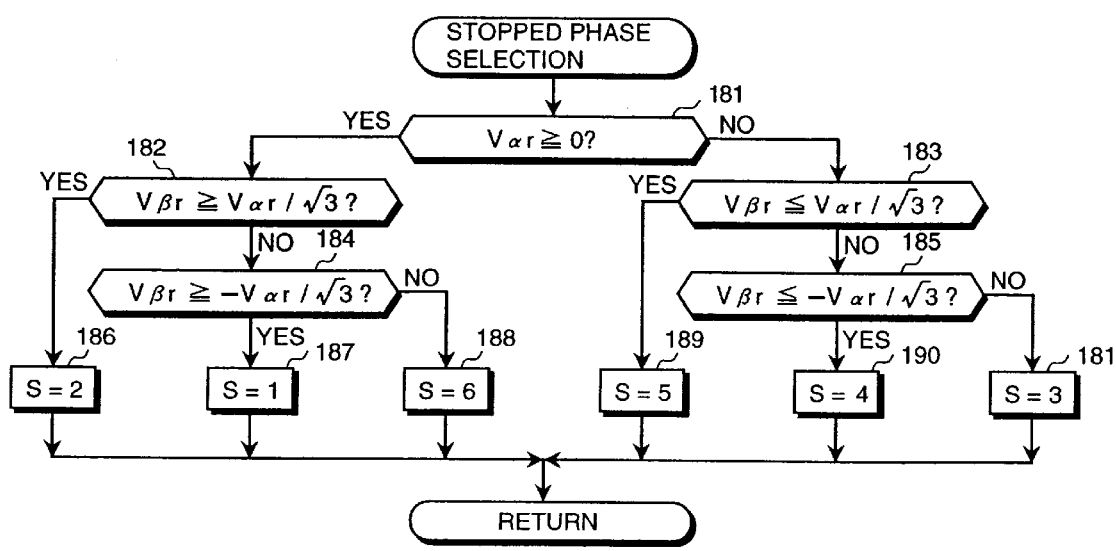
FIG. 13 is a flow chart showing the process in the switching stop phase selection means when the process of FIG. 12 is performed.

Referring to FIG. 13, the sign of $v_{\alpha r}$ is judged in step 181. If the sign of $v_{\alpha r}$ is positive, the processing jumps to step 182. If the sign of $v_{\alpha r}$ is negative, the processing jumps to step 183. In step 182, if $v_{\beta r}$ is larger than $v_{\alpha r}/\sqrt{3}$, the control mode is set to S=2.

Figure 14:
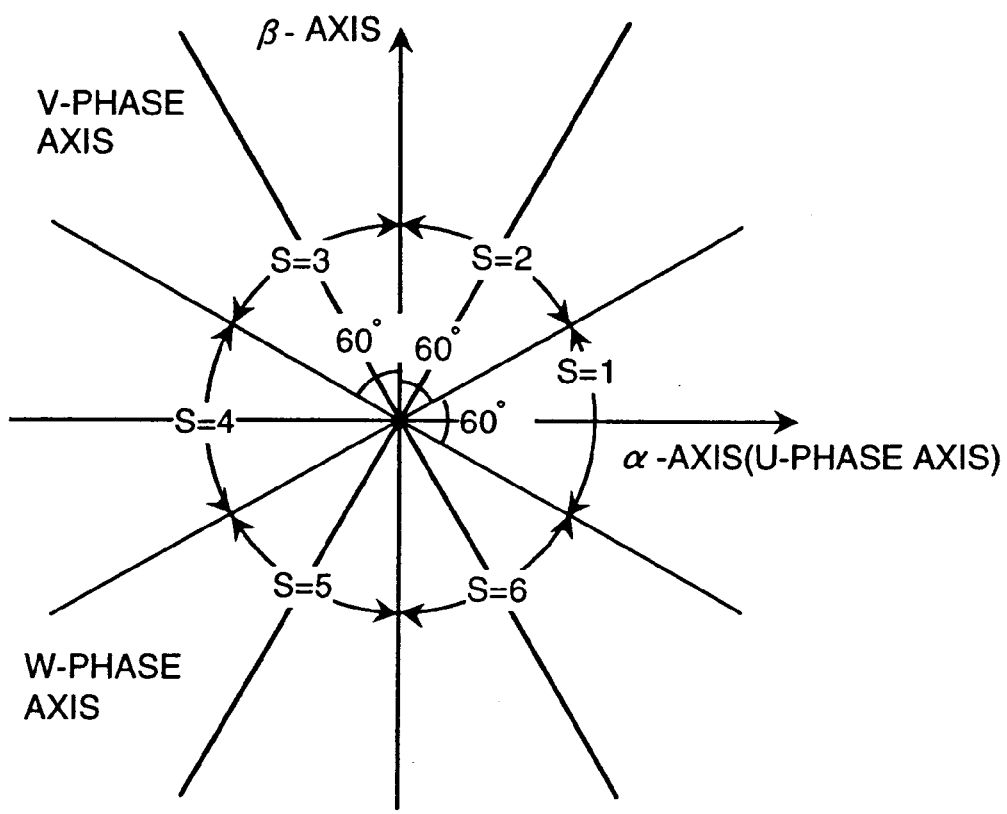
FIG. 14 is a voltage vector diagram showing control mode sections of FIG. 13.

If $v_{\beta r}$ is smaller than $v_{\alpha r}/\sqrt{3}$, $v_{\beta r}$ and $v_{\alpha r}/\sqrt{3}$ are compared in step 184 and it is judged whether the control mode is S=1 or 6. The processing in steps 184 and the processing in step 185 are the same as the above. By this judgement, a voltage command value is classified in the vector regions shown in FIG. 14. This method involves very simple processing since a stopped phase of the two-phase switching is selected using only the voltage command value.

Therein, by employing a method of controlling the power factor of the magnet synchronous motor 29 to nearly 1 (one), the switching loss can be minimized while the selection method of the two-phase switching is made easy. Therefore, by employing the present embodiment, it is possible to reduce the switching loss and to improve the efficiency with a further simple method.

Although the present invention has been described above in its preferred embodiment and it has been assumed that a micro-computer is employed as the controller 7 to perform software processing, it is needless to say that hardware processing using digital circuits or analogue circuits may be available. Further, although plural embodiments have been described above, a combination of the features of these embodiments may be employed.

According to the present invention, it is possible to provide an inverter system which can reduce the switching loss and can be operated at high efficiency, since the pulse width modulation control is performed on a phase having a smaller current compared to the conventional two-phase switching method.

Particularly, when the present invention is applied to an electric vehicle, the efficiency can be further improved by combination with field control.

We claim:

1. An inverter system comprising inverters for supplying electric power to a multi-phase load according to pulse width modulation signals, and a controller for controlling said inverters while stopping a pulse width modulation signal of any one phase of said multi-phase load, wherein said controller controls said inverters by selecting a plurality of phases for which said pulse width modulation signals are allowed to stop, and stopping a pulse width modulation signal corresponding to a phase having the largest phase current among said selected plurality of phases, and wherein said phase current is estimated based on a current command value to be supplied to said load.

2. An inverter system comprising inverters for supplying electric power to a multi-phase load according to pulse width modulation signals, and a controller for controlling said inverters while stopping a pulse width modulation signal of any one phase of said multi-phase load, wherein said controller comprises voltage compensation means which stops a dead-time compensation for said phase for which supply of said pulse width modulation signal is stopped, and applies a dead-time compensation voltage to other phases, said dead-time compensation voltage being determined on the basis of a direction of a current of each of said other phases.

3. An inverter system comprising inverters for supplying electric power to a multi-phase load according to pulse width modulation signals, and a controller for controlling said inverters with said pulse width modulation signals, wherein said controller comprises switching means for switching between a circuit for controlling all of the phases by said pulse width modulation signals and a circuit for controlling the inverters while at least one pulse width modulation signal to at least one phase is being stopped.

4. An electric vehicle control system comprising an induction motor for driving the vehicle, an inverter system for controlling said induction motor, and a controller for generating pulse width modulation signals to be input to said inverter system in response to a current command value for said induction motor, wherein said controller drives said induction motor with a reduced field control, and stops at least one pulse width modulation signal of at least one phase among said pulse width modulation signals.

5. An electric vehicle control system according to claim 4, wherein said phase of which the pulse width modulation signal is stopped is delayed by 30 degrees from a pre-set reference phase-angle when said induction motor is in a power driving state and is advanced by 30 degrees from said reference phase-angle when the induction motor is in a regeneration state.

6. An electric vehicle control system comprising a synchronous motor for driving the vehicle, an inverter system for controlling said synchronous motor, and a controller for generating pulse width modulation signals to be input to said inverter system from any one of a current command value to be conducted to and a voltage command value to be applied to said synchronous motor, wherein said controller performs field control of said synchronous motor, and stops at least one pulse width modulation signal of one phase among said pulse width modulation signals.

7. An electric vehicle control system according to claim 6, wherein said phase for which said pulse width modulation signal is stopped is determined based on a voltage to be applied to said synchronous motor.

8. An electric vehicle control system according to claim 7, wherein said controller estimates said voltage based on said voltage command value.

9. An electric vehicle control system according to any one of claim 4 or claim 6, wherein said controller performs field control so that a power factor of the motor becomes 0.86 or more.

10. An electric vehicle control system according to claim 9, wherein said phase for which said pulse width modulation signal is stopped is determined based on a magnitude of a current flowing to said motor.

11. An electric vehicle control system according to claim 10, wherein said controller estimates said magnitude of current based on said current command value.

* * * * *